No. 687,314. Patented Nov. 26, 1901.
T. M. JARMAIN.
SWATH TURNING MACHINE.
(Application filed Dec. 28, 1897.)
(No Model.)
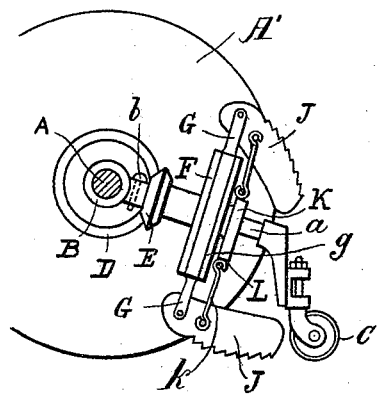
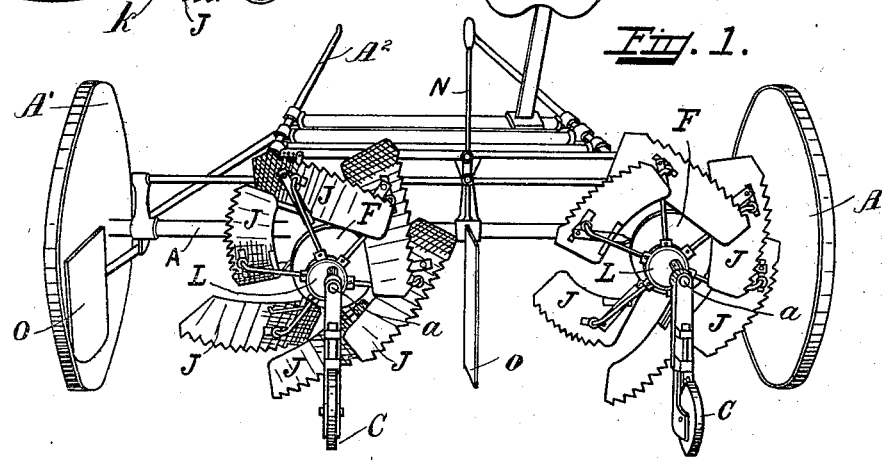
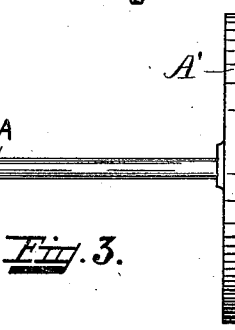

UNITED STATES PATENT OFFICE.

THOMAS MARTIN JARMAIN, OF NEAR TETSWORTH, COUNTY OF OXFORD, ENGLAND.

SWATH-TURNING MACHINE.

SPECIFICATION forming part of Letters Patent No. 687,314, dated November 26, 1901.

Application filed December 28, 1897. Serial No. 664,094. (No model.)

*To all whom it may concern:*

Be it known that I, THOMAS MARTIN JARMAIN, a subject of the Queen of Great Britain and Ireland, residing at Hasley Iron Works, near Tetsworth, Oxfordshire, England, have invented certain new and useful Improvements in Swath-Turning Machines, (for which I have obtained a patent in Great Britain, No. 15,171, dated July 8, 1896; in Belgium, No. 124,385, dated November 5, 1896; in Germany, No. 94,924, dated November 1, 1896; in France, No. 261,219, dated November 12, 1896, and in Canada, No. 60,939, dated May 13, 1898,) of which the following is a specification.

My invention consists in the novel features hereinafter described, reference being had to the accompanying drawings, which illustrate one form in which I have contemplated embodying my invention, and said invention is fully disclosed in the following description and claims.

Referring to the said drawings, Figure 1 is a rear view of a swath-turning machine embodying my invention. Fig. 2 is a partial vertical section through the machine. Fig. 3 is a top plan view of the machine with the shafts and one of the swath-turning devices removed. Fig. 4 is a view of one of the eccentrics and its strap.

In the drawings, A represents the axle of my machine, which is supported and driven by two wheels A' A', as shown. To the axle A is secured suitable draft appliances, as the shafts $A^2$. (Shown in Fig. 1.) Upon the axle A are mounted two bearings B, to each of which is secured, by means of a cotter $b$ or equivalent device, a rearwardly-extending bar or spindle $a$, the rear end of which is provided with a supporting caster-wheel C. Upon each of the horizontal spindles $a$ $a$ is placed a rotary sleeve, provided at its front end with a bevel-pinion E and at its rear end with a disk F. The pinion E engages a driving bevel-gear D, secured to the main shaft. To each of the disks F are secured a series of arms G, to the outer end of each of which is pivoted a blade or wing J, preferably curved, as shown, and having its outermost longitudinal edge serrated or notched, as shown in the drawings. Adjacent to the disk F on each of the spindles $a$ is an eccentric L, rigidly secured to the spindle and provided with a strap K. The strap K is provided with a series of links $k$, one of which is pivotally connected to each of the blades or wings at a point at one side of its pivotal connection with its supporting-arm G. This arrangement is such that the forward end of each blade or wing will be drawn inward during the upper part of its cycle and forced outward during the lower part of its cycle, so as to give it a longer sweep along the ground than it would otherwise have.

O O represent shields secured to the framework of the machine and projecting rearwardly on the side of each of the sets of rotary blades, toward which they throw the hay or grass, to prevent it from being thrown too far. In this instance I have shown a guard or shield O at the left of each set of rotary blades.

As the machine is drawn along, the rotation of the axle will rotate the disks F F and the arms G and blades J, connected therewith. As each blade descends into proximity with the ground its leading end will be lowered and will remain in contact with the hay or grass much longer than it would if the blade were rigidly attached to the arm carrying it. The blades in rotating turn the swath or windrow over, so as to expose the under side thereof, and by means of the eccentrics each blade is given a longer sweep adjacent to the ground than it would have if it were rigidly secured to its supporting-arm. Each blade J is attached to its arm G, so that it sets at an angle to or inclined to the line of draft, so that the front surfaces of the blades are partly inclined to the direction of travel and partly to the sides of the machine.

What I claim, and desire to secure by Letters Patent, is—

1. In a swath-turning machine, the combination with the frame, of a series of rotary blades carried thereby, disposed substantially perpendicularly to the line of draft, each blade being pivotally supported, mechanism for rotating said series of blades as the machine is drawn along, and mechanism for lowering the leading end of each blade as it approaches the ground to give the blades an increased sweep, substantially as described.

2. In a swath-turning machine, the combination with the frame, of a rotary series of blades disposed substantially perpendicularly to the line of draft, each blade of said series being pivotally mounted, disposed in an inclined position to the line of draft and provided with an outer serrated edge, mechanism for rotating said series of blades and mechanism for lowering the leading end of each blade as it approaches the ground to increase its sweep, substantially as described.

3. In a swath-turning machine, the combination with the frame and supporting-wheels, of a rotary series of arms, disposed substantially perpendicularly to the line of travel of the machine, a blade pivotally secured to each of said arms, an eccentric, a strap engaging said eccentric and links connected to said strap and to said blades eccentrically to their pivotal connection to said arms and mechanism for rotating said arms and blades, substantially as described.

4. In a swath-turning machine, the combination with the frame and supporting-wheels, of a rotary series of arms, disposed substantially perpendicularly to the line of travel of the machine, a blade secured to each arm and arranged in an inclined position to the line of travel of the machine, said blades being provided with an outer serrated edge, an eccentric and eccentric-strap and links connected to said strap and connected to said blades eccentrically to their pivotal connection with said arms and means for driving said rotary arms, substantially as described.

5. In a swath-turning machine, the combination with the axle, of a spindle extending rearwardly therefrom, a series of rotary arms mounted on said spindle, a blade pivoted to each of said arms, an eccentric on said spindle, an eccentric-strap engaging said eccentric, and links connected to said eccentric-strap and connected to said blades eccentrically to their connections with said arms, and driving connections between the axle and said rotary arms, substantially as described.

6. In a swath-turning machine, the combination with the axle, of a spindle extending rearwardly therefrom, a wheeled support for the rear end of said spindle, a sleeve on said spindle provided with a gear at its front end and with a series of radial arms at its rear end, a blade pivoted to each of said arms disposed in an inclined position to the line of draft and provided with a serrated outer edge, an eccentric fixed on said shaft, a revoluble strap on said eccentric, links connected to said strap, each link being connected to one of said blades eccentrically to its pivotal connection with its supporting-arm, and a driving-gear on the axle engaging the gear on said sleeve, substantially as described.

In witness whereof I have hereunto set my hand in the presence of two witnesses.

THOMAS MARTIN JARMAIN.

Witnesses:
A. E. WILLIAMS,
CHAS. BAUER.